Patented Nov. 1, 1938

2,134,732

UNITED STATES PATENT OFFICE 2,134,732

APPARATUS FOR FEEDING MOLTEN GLASS

Thomas Finney Pearson, Pontefract, England, assignor to Crown Cork & Seal Co. Inc., New York, N. Y., a corporation of New York Application April 17, 1935, Serial No. 16,918
In Great Britain April 23, 1934

13 Claims. (Cl. 49—1)

The present invention relates to improvements in the gathering of charges of glass from a glass tank or furnace.

It is a well known phenomena in connection with the manufacture of articles from molten glass that the glass passing from a tank or furnace into a preheater accumulates a cold skin where it is exposed and it is highly undesirable that such cold skin should form part of the charge, as this results in a gather of uneven temperature. With a view to attempting to avoid accumulation of this skin and to avoid the skin forming part of the charge, it has been proposed to provide stirring devices keeping the glass within the forehearth of the furnace, in continuous circulation.

Such devices, however, have not fully achieved the desired object, in that although fresh glass was continuously being brought to the pick-up point, yet the cold skin of the surface of the molten glass was still present, and was picked up by the gathering head or the like tool.

According to the present invention, a skimmer is periodically depressed into the surface of the molten glass in a tank or furnace, and then whilst partly immersed is given a displacement in the tank or furnace thus positively removing the skin and presenting a clean fresh mass of glass to a gathering head or tool.

The invention is more particularly described with reference to the accompanying drawings in which—

Figure 1:
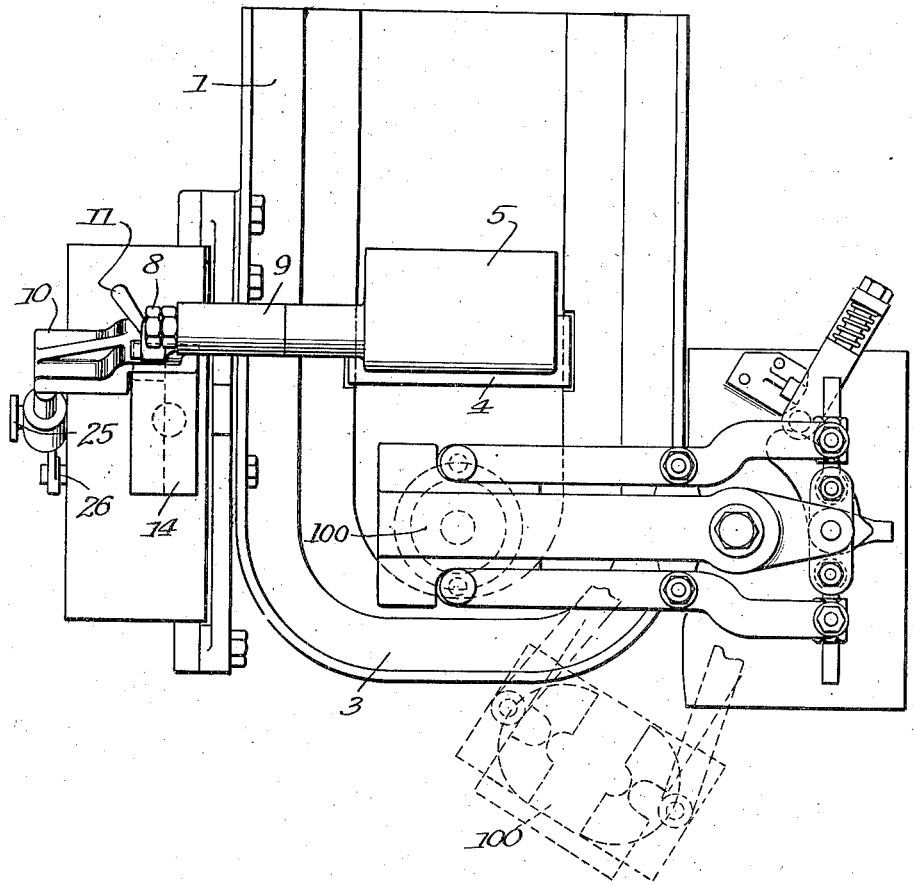
Figure 1 is a plan view of the gathering end or boot of a glass furnace or tank with the skimming arrangement.
Figure 2:
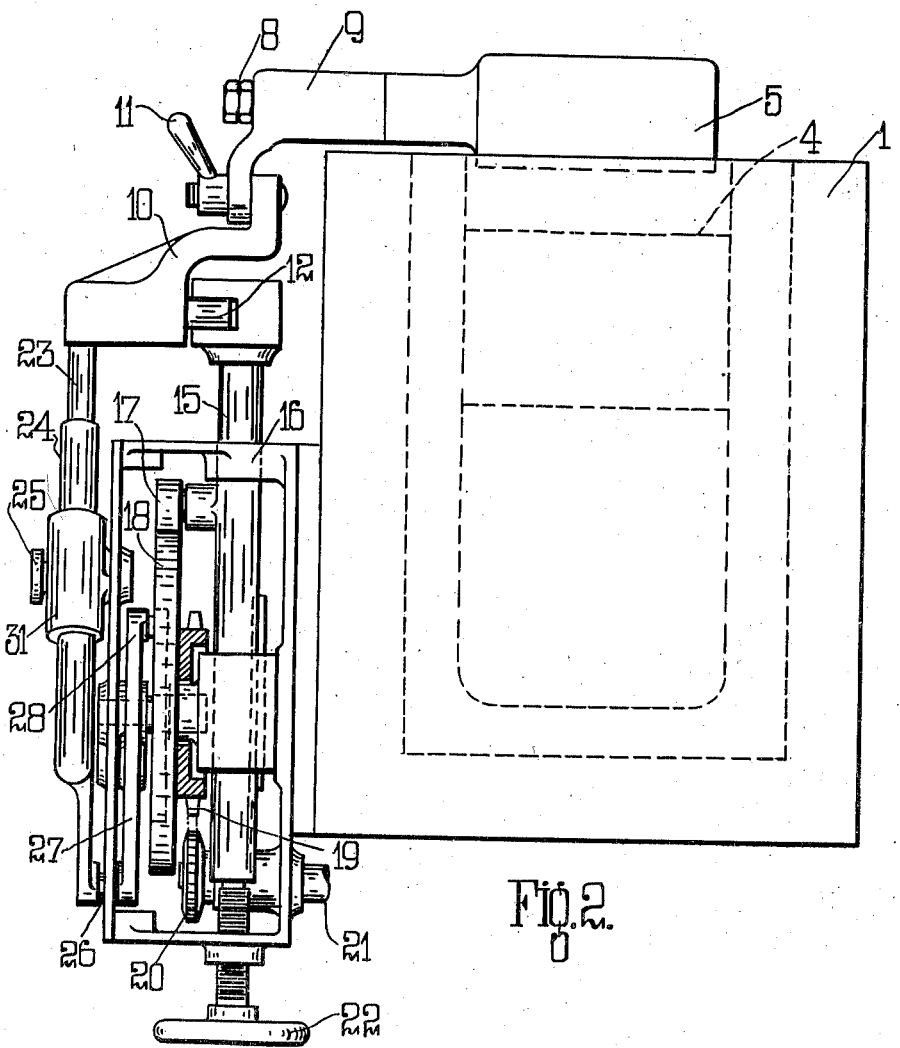
Figure 2 is a corresponding end elevation.

The gathering end or boot 1 of a glass tank or furnace has, preferably, but not essentially, a bridge 2 of refractory material disposed in it at a spaced distance from its front wall 3, the top surface 4 of this bridge being inclined, as shown. The bridge preferably has its ends disposed in recesses formed in the inner faces of the side walls of the boot, and is supported on the bottom surfaces of those recesses.

The skimming device is adapted to operate from a point close up to the front wall 3 to a point just over the bridge 2, which skimming device comprises a refractory block 5 forming the skimming tool having a nose-piece 6, which is adapted to dip under the surface 7 in the glass of the tank, and whilst so immersed move backwards towards the bridge 2, whereupon the tool 5 is raised from the glass 7, moved back across the surface of the glass but clear of it, and then down again into the glass.

It will be preferred that either a hand-operated or a mechanically operated gathering tool or head, such for instance, as a suction operated gathering head mechanically swung over the boot end of the furnace and dip down to draw up a charge of glass therefrom, has its motion arranged in timed sequence with the skimming tool 5, so that it will dip down into the glass 7 and draw up a charge into its gathering mould immediately after the tool 5 has been moved back and removed the accumulated skin or scum on the glass lying between the bridge 2 and the front wall 3.

As shown in Figure 1, a gathering head 100 of the type shown in my companion, copending application Serial No. 16,920, filed April 17, 1935, may be used with the skimmer of the present invention. The actions of the gathering device, as stated above, are properly timed to operate in a predetermined relation to the actions of the skimmer. As shown in Figure 1, the skimming tool 5 is disposed at the rear end of its stroke, above the inclined surface 4 of the bridge 2, while the gathering head 100 is in the position to pick up a charge of glass from the gathering area of the forehearth. The discharge position of the gathering head is indicated in dotted lines. The means for raising and lowering and for swinging the gathering head between the gathering and discharge positions will not be described in the present application, since that is the subject matter of my copending application, Serial No. 16,919.

This skimming operation moreover will have the effect that there will be a circulation of glass from the front wall 3 over the bridge 2 down the back of the bridge and up again between the bridge 2 and the front wall 3. The effect of the skimming tool 5 will therefore, not only be one of clearing the surface of the molten glass at the pick-up place of skin or scum, but also will be the desirable effect of producing a circulation of glass within the boot or gathering end of the tank.

The skimming tool 5 may either be of a non-corrodible metal or may be of refractory material, and is preferably mounted by means of a bolt 8 to be interchangeable upon an arm 9 detachably secured to a bracket 10 by means of a hand-operated bolt 11. The bracket 10 is provided with a pin 12 moving in a guideway 13 in a cross-head 14 carried by a spindle 15, which spindle is movable in guides in a frame 16 secured to the side wall of the furnace. This spindle 15 has a roller 17 co-operating with a face cam 18 which is secured to a sprocket wheel 19 receiving its drive from a sprocket 20 rotated continuously from a shaft 21 driven from any desired source of power. The whole gear can be raised or lowered by the hand-wheel 22 for the purpose of adjusting the limits of rise and fall of the skimming tool 5 to compensate for instance, for varying levels of glass in the tank 3.

The bracket 10 is carried by a spindle 23 telescopically mounted within a sleeve 24 supported by a bearing 31 adapted to swing about a pin 25. The sleeve 24 has a pivotal connection 26 with an arm 27 pivoted at 30 to the frame, having a pin 28 engaging with a groove 29 in the cam 18.

It will consequently be seen that by this means the skimming tool 5 is given a motion in a substantially rectangular or elliptical path, viz, downwards into the glass, back in a horizontal plane, vertically out of the glass, and finally forwards above the glass in a horizontal plane, whilst in the case of a mechanically operated charge gathering head, this will be operated in timed sequence thereto, so that the gathering head dips into the surface of the glass 7 just behind the tool 5 as it moves back away from the front wall 3.

Figure 3:
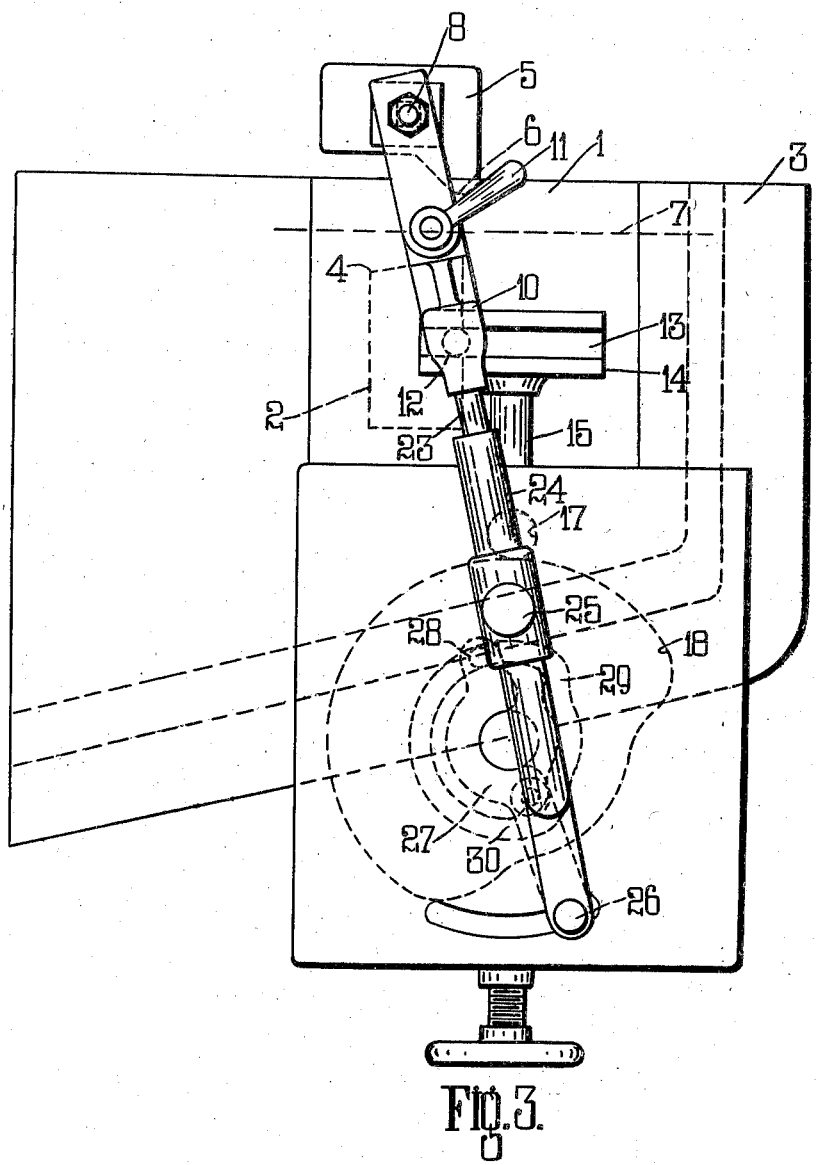
Figure 3 is a corresponding side elevation.

It will also be appreciated that by virtue of the movement of the skimming tool 5 the glass is given an anticlockwise displacement, as viewed in Figure 3, that is to say it is displaced over the downwardly inclined upper face 4 of the bridge 2, thence downwardly behind the bridge, forwardly below the bridge, and finally upwardly between the bridge and the front wall 3. The glass is prevented from flowing forwardly above the bridge by virtue of the inclined face 4 thereof.

It will be obvious that by the cam mechanism 18 it will be possible to give a dwell to the motion of the skimmer, as it reaches the point remote from the front wall 3, if so desired.

I declare that what I claim is:

1. Apparatus for conditioning glass in the gathering area of a forehearth comprising a refractory bridge spaced rearwardly from the forward wall of the forehearth adjacent the rear of the gathering area and extending thereacross and having its lower surface spaced from the floor of the forehearth, and means for moving the glass from the surface of the gathering area rearwardly over said bridge and to circulate hot glass forwardly and upwardly under said bridge, said means comprising a skimmer and means for moving the same rearwardly over the surface of the gathering area in contact with the glass and forwardly out of contact with the glass.

2. Apparatus for conditioning glass in the gathering area of a forehearth comprising a refractory bridge extending across the forehearth at a point spaced rearwardly from the forward wall thereof and adjacent the rear of the gathering area, said bridge having its lower surface spaced from the floor of the forehearth and its upper surface spaced below the normal glass level, and means for moving the surface glass rearwardly over said bridge and to circulate hot glass forwardly under said bridge, said means comprising a skimmer and means for moving the same rearwardly over the surface of the gathering area in contact with the glass to a point above said bridge and then forwardly out of contact with the glass to a point adjacent said forward wall.

3. Apparatus for conditioning glass in the gathering area of a forehearth comprising a refractory bridge extending across the forehearth at a point spaced rearwardly from the forward wall thereof and adjacent the rear of the gathering area, said bridge having its lower surface spaced from the floor of the forehearth and its upper surface inclined rearwardly and downwardly and spaced below the normal glass level, and means for moving the surface glass from the gathering area rearwardly to a point above said bridge to displace cold glass rearwardly over said bridge and to circulate hot glass forwardly under said bridge, said means comprising a skimmer and means for moving the same rearwardly over the surface of the gathering area in contact with the glass from a point adjacent the forward wall to a point above said bridge and for moving the same forwardly out of contact with the glass to said point adjacent the forward wall.

4. Apparatus for conditioning glass in the gathering area of a forehearth comprising a refractory bridge extending across the forehearth at a point spaced rearwardly from the front wall thereof and adjacent the rear of the gathering area, said bridge having its lower surface spaced from the floor of the forehearth and its upper surface disposed slightly below the normal glass level, and means for moving the surface glass from the gathering area rearwardly toward said bridge, said means comprising a skimmer and means for moving the skimmer rearwardly over the surface of the gathering area in contact with the glass, said moving means serving to withdraw said skimmer from the glass at a point adjacent said bridge and return it while out of contact with the glass to a point adjacent said forward wall.

5. Apparatus for conditioning glass in the gathering area of a forehearth comprising a refractory bridge extending across the forehearth at a point spaced rearwardly from the front wall thereof and at the rear of said gathering area, said bridge having its lower surface spaced from the floor of the forehearth and its upper surface disposed slightly below the normal glass level, a skimmer mounted to operate over and through said gathering area, and means for imparting translational movement to said skimmer through a rectangular orbit, part of which orbit is in the glass from said gathering area to circulate cold glass over the bridge and hot glass thereto from under the bridge.

6. In combination, a forehearth having a forwardly disposed gathering area, a bridge extending across the forehearth rearwardly of said area, a skimmer of substantially the same width as the forehearth adapted to work in said gathering area, and means for moving the same through a rectangular orbit in a vertical plane to skim the surface glass from said area rearwardly over said bridge, and to cause a circulation of hot glass to said area exclusively by a flow upwardly from under said bridge.

7. In combination, a substantially rectangular forehearth extension provided with a suction gathering area adjacent its forward wall, a refractory bridge spaced rearwardly from said forward wall and defining the rear end of said gathering area, said bridge having its lower surface spaced from the floor of said forehearth extension, and means for moving a stratum of glass from the upper surface of said gathering area rearwardly of said bridge and for replenishing the supply of glass in the gathering area solely by a forward and upward flow of glass under said bridge, said means comprising a skimmer, and means for moving the same in a substantially rectangular orbital path in a vertical plane through the glass over the surface of said gathering area rearwardly from a point adjacent the forward wall toward said bridge and for returning the skimmer to said point while out of contact with glass.

8. A device for skimming the surface of a gathering area in a forehearth comprising a skimming head, a bracket carrying said head, and means for supporting said bracket and for moving the same through a substantially rectangular translational orbit in a vertical plane, said means comprising a vertically reciprocating cross head upon which the bracket is supported for relative horizontal movement, and an oscillating arm connected to said bracket for moving the latter back and forth on said cross head in timed relation to the vertical reciprocations of the cross head.

9. A device for skimming the surface of a gathering area in a forehearth comprising a frame, a skimming head, a bracket carrying said head, and means for moving said bracket and head through a substantially rectangular translational orbit in a vertical plane, said means comprising a vertically reciprocating cross head mounted in said frame, having a horizontally disposed guideway upon which said bracket is supported for relative horizontal sliding movement, a telescopic arm connected to said bracket at its free end and pivoted to said frame at a point spaced from the bracket, and means for oscillating said arm to move the bracket back and forth on said cross head in timed relation to the vertical reciprocations of the latter.

10. A device for skimming the surface of a gathering area in a forehearth comprising a frame disposed laterally of said forehearth, a bracket mounted for movement above said frame, a skimming head carried by said bracket and extending laterally over the side of the forehearth to a position above the gathering area, and means carried by said frame and disposed laterally of the forehearth for supporting and moving the bracket and skimming head through a substantially rectangular translational orbit in a vertical plane, said means comprising a cam actuated vertically reciprocable cross head having a horizontal guideway disposed thereon and upon which the bracket is supported for relative horizontal sliding movement, a telescopic arm having one of its sections pivoted to said frame and another of its sections connected to said bracket, and cam means for oscillating the first mentioned section of said telescopic arm in timed relation to the vertical reciprocations of the cross head, to move the bracket horizontally on said cross head in timed relation to the vertical movements imparted to the bracket by the cross head.

11. In an apparatus of the class described, a forehearth, a suction gathering device adapted to pick up charges of glass from a gathering area therein, a device for freeing the surface of the molten glass in the forehearth of scum, said device comprising a skimmer of substantially the width of the forehearth timed to cooperate with the suction gathering device and mounted for movement in the forehearth in a rectangular path intersecting the surface of the molten glass in the gathering area and dipping into the glass adjacent a wall of the forehearth and moving horizontally through the glass in the gathering area to displace the scum, and auxiliary means to prevent flow-back of the displaced scum to the gathering area for the suction gathering device.

12. In an apparatus of the class described, a forehearth, a suction gathering device pivotally mounted adjacent the forehearth adapted to swing from a gathering position over the forehearth to a discharge position laterally thereof, and a skimmer mounted independently of the suction gathering device for freeing the surface of the glass in the gathering area of the forehearth of scum, said skimmer comprising a head, and means independent of the gathering device for moving the head through the glass from a forward point toward the rear of the forehearth in timed relation to the swinging movement of the gatherer, said movements of said head serving to circulate the glass and scum rearwardly from said gathering area and to bring hot glass forwardly and upwardly in the gathering area.

13. In an apparatus of the class described, a forehearth, a suction gathering device adapted to pick up charges of glass from a gathering area therein, and a device for freeing the surface of the molten glass in the forehearth of the scum, said suction gathering device comprising a swinging arm having a suction head at its free end adapted to be dipped in the glass in the gathering area, said surface freeing device comprising a skimmer head mounted independently of the suction gathering device, and means for moving the skimmer head through a rectilinear path in a vertical plane over and through the surface of the glass in the gathering area, the movements of said skimmer head being timed in predetermined relation to the movements of the gatherer.

THOS. FINNEY PEARSON.